(12) United States Patent
Wiethoff et al.

(10) Patent No.: US 8,261,597 B2
(45) Date of Patent: Sep. 11, 2012

(54) METHOD AND DEVICE FOR DETERMINING THE QUALITY OF MILK PRODUCED BY MACHINE MILKING

(75) Inventors: Magnus Wiethoff, Oelde (DE); Olaf Suhr, Oelde (DE)

(73) Assignee: GEA Farm Technologies GmbH, Boenen (DE)

( * ) Notice: Subject to any disclaimer, the term of this patent is extended or adjusted under 35 U.S.C. 154(b) by 0 days.

(21) Appl. No.: 10/587,065

(22) PCT Filed: Jan. 24, 2005

(86) PCT No.: PCT/EP2005/000660
§ 371 (c)(1),
(2), (4) Date: May 15, 2007

(87) PCT Pub. No.: WO2005/070196
PCT Pub. Date: Aug. 4, 2005

(65) Prior Publication Data
US 2007/0289364 A1    Dec. 20, 2007

(30) Foreign Application Priority Data

Jan. 23, 2004 (DE) .................. 10 2004 003 782
Mar. 24, 2004 (DE) .................. 10 2004 014 832

(51) Int. Cl.
*G01N 15/06* (2006.01)
(52) U.S. Cl. ................................ 73/61.71
(58) Field of Classification Search ........... 119/14.18; 73/61.41
See application file for complete search history.

(56) References Cited

U.S. PATENT DOCUMENTS

| 4,376,053 A | 3/1983 | Bullock et al. |
| 6,571,731 B1 * | 6/2003 | Maier, Jr. ................ 119/14.08 |
| 6,578,516 B1 * | 6/2003 | Oosterling et al. ........ 119/14.18 |

FOREIGN PATENT DOCUMENTS

| DE | 101 31 781 C1 | 10/2002 |
| EP | 1 000 535 A1 | 5/2000 |
| EP | 1 126 757 B1 | 11/2002 |
| WO | WO 00/27183 | 5/2000 |
| WO | WO 00/67559 | 11/2000 |

OTHER PUBLICATIONS

PCT/IB/338, Notification of Transmittal of Translation of the International Preliminary Report on Patentability received Oct. 19, 2006, 1p.
PCT/IB/373, International Preliminary Report on Patentability received Oct. 19, 2006, 1p.
PCT/ISA/237, Written Opinion of the International Search Authority received Oct. 19, 2006, 5pp.
English language Abstract, Translated Description and Claims of DE 101 31 781 C1, European Patent Office's esp@cenet.com database, 8pp.

* cited by examiner

*Primary Examiner* — Hezron E Williams
*Assistant Examiner* — Paul West
(74) *Attorney, Agent, or Firm* — Smith Law Office (57) ABSTRACT

A method for determining the quality of milk wherein a sample is examined and the type of at least one detected object is determined on the basis of at least one object recognition rule.

27 Claims, 3 Drawing Sheets

Erstellen einer Referenzabbildung

↓

Ermittlung von Objekten (Fehlstellen, Partikel etc.)

↓

Abbildung einer Probe

↓

Fehlerabbildung

↓

Objektermittlung

↓

Objekttypisierung

METHOD AND DEVICE FOR DETERMINING THE QUALITY OF MILK PRODUCED BY MACHINE MILKING

FIELD AND BACKGROUND OF THE INVENTION

The object of the invention relates to a method and a device for determining the quality of milk, in particular in machine milking. Raw milk is a principal raw material for the food industry and important as food. For the protection of consumers and to ensure technical processability, raw milk must satisfy both national and international quality requirements.

According to §3 of the Ordinance on Hygiene and Quality Requirements for Milk and Milk Products based on milk (Ordinance on milk in the Federal Republic of Germany), raw milk must not show anomalous sensory characteristics, such that according to Annex 3 of the Ordinance on milk, persons who milk animals must separately milk the first jets of milk from each teat so as to verify the perfect quality by inspecting the appearance of the milk of each animal. According to §18 para. 1 No. 1 of the Ordinance on milk the first jets of milk must not be placed on the market as foodstuff.

Animals whose milk is extracted as foodstuff must not suffer from recognizable udder inflammation according to Annex 1 of the Ordinance on milk. Corresponding legislation (Council Directive 92/46 EEC, Annex A and Council Directive 89/362 EEC, Annex Chapter III) is applicable within the European Union.

An indication of recognizable udder inflammation—clinical mastitis—is among other things the presence of clots in the milk yield from individual gland complexes, udder quarters or udder halves and in the entire milk yield of any individual animal. Such clots may consist of tissue residue, vibrio, cell detritus, blood coagula, and mastitis pathogens.

It is known that the size of macroscopic, detectable clots ranges from 100 µm to several millimeters. Accumulated clots in specific milk yield fractions, primarily the foremilk and first milk, may result in a highly viscous secretion with particles of several millimeters in diameter. Such clots are critical particles as regards quality since they determine and may even prohibit marketability of raw milk.

Apart from clots, foremilk and first milk may comprise particles not indicative of a recognizable udder inflammation but foreign matter from the ambience. The reason that such particles enter the foremilk and first milk may be inadequate cleaning of the animal udder or reattaching the milking unit after it was kicked off. Such particles include for example wood chips, straw particles, hair, hay, sand, bedding, and feces.

In conventional milking technology, milk collection pieces tend to be used from which the milk is routed in a long milk hose through a milk line to a bulk milk tank where it is cooled and stored. The milk is then processed further in specialist works. Automatic milking installations (AMI) are typically not equipped with short milk hoses and a milk collection piece, such that the milk is routed from the teat cups in separate milk hoses to the milk line and finally, collected, cooled and stored in a bulk milk tank.

The milk yields from multiple animals milked concurrently will commingle in the milk line. The bulk milk tank receives all of the milk yield of the animals in a dairy animal farm which collected milk is called herd bulk milk.

Under the directives of the Ordinance on milk any animals with recognizable udder inflammation must be milked separately where conventional milking technology provides that between the long milk hose and the junction into the milk line a collecting container is installed into which the milk of such animals is fed. This milk yield will then be discarded. The decision whether or not milk is obviously different from what it should be is based on prior inspection by the milker of the appearance of the separately extracted foremilk.

In practice, however, there is the risk that the visual characteristics check will often be skipped since it is in general time-demanding and thus uneconomic. Devices which allow the trapping of clots must be checked by the milker which is also very time-demanding.

Automatic and robot-assisted milking installations do not allow any visual inspection of the separately extracted foremilk by a person. The technical devices and methods thus far known operate inadequately such that there is no guarantee that milk extracted in automatic milking will satisfy national and international quality requirements.

Different methods and devices are known for determining particles in milk. The U.S. Pat. No. 4,376,053 for example proposes a filter unit comprising a filter casing having an outwardly open slot. The filter casing carries a filter element that is supported by a sealing means in a fitted frame. For visual inspection of the milk yield for any particles the filter element is removed from the filter housing and visually inspected. To avoid clogging of the milk line through the filter element which may cause the vacuum at the milking unit to drop which may in turn cause the milking units to fall off, a by-pass is provided parallel to the milk flow path.

In WO 00/67559 an apparatus for the automatic selecting out of milk during machine milking is depicted. This device comprises a measuring device for monitoring the extracted milk. An inspection of the particles deposited on a filter is carried out by detection through a detector means. It is proposed to perform particle detection by measuring the loss of intensity in radiation through the filter element, i.e. in transmission. There is also the option to measure the quantity of deposited particles by measuring the reflected intensity. To verify the presence of particles exceeding a predetermined extent, WO 00/67559 proposes that radiation be emitted substantially parallel to the filter surface. A suitable selection of the distance of the radiation source and the receiver from the filter surface allows to determine the extent of the particles in a plane. To obtain information on the particle sizes it is also proposed to equip the filter element with electrically conductive elements distanced and insulated from one another. If current or voltage is applied to these elements, the quantity of particles present on the filter surface can be established. This would require that the resistance ratio changes in relation to the deposited particles.

This approach is not without problems since the electrical conductivity of the milk is different for each animal. The electrical conductivity can also change in the course of the lactation period. The nutrition of the animals will also influence the physical characteristics of raw milk. Electrically non-conductive particles cannot be detected unless they are moistened by a conductive liquid (milk, water) but then the milk conductivity will be measured for electrically non-conductive particles and no further details on the particle are obtained.

The clots or particles must be determined for each individual animal. This requires that the filter element can be reliably and safely cleaned without the risk of contaminating subsequent milk streams with particles from previous milk yields. In the apparatus known from WO 00/67559 the filter element is cleaned in that the particles deposited on the filter element are washed out with the aid of the milk stream when the filter element is turned. Alternatively, "back splash" cleaning of the filter element may be employed. This involves the risk that particles from the subsequent milk stream may be deposited on the edge face of the filter element which may result in incorrect measuring. There is also the risk that particle-free milk streams are contaminated with quality-diminishing particles from previous milk yields.

Since crucial criteria for a perfect quality of milk include not only an absence of particles but in particular an absence of clots—because clot-containing milk indicates an udder inflammation which would prohibit that it enter the food chain—it is imperative to recognize and separate clot-containing milk. In addition to the prior art described in WO 00/67559, EP 1 126 757 B1 and DE 101 31 781 C1 have disclosed other devices and methods for examining milk for particles. The mere detection of particles is, however, not sufficient for determining the quality of milk since a checking for the presence of particles may degrade good quality milk as clot-containing milk if foreign matter such as straw, sand, . . . have entered it. This cannot be entirely excluded even after cleaning the udder since cleaning may have been performed inadequately or improperly. It is readily possible that air bubbles or foam are identified as particles. Conventional devices and methods do not allow a distinction.

SUMMARY OF THE INVENTION

On the basis of the above, the present invention is directed at proposing a method and a device for determining the quality of milk.

The invention provides a method which allows to determine the quality of milk. To this purpose, a sample and in particular a milk sample is examined wherein the type of at least one detected object is determined on the basis of at least one object recognition rule.

The invention has many advantages.

Preferably at least one object is extracted from the sample. It is in particular possible and preferred that objects are isolated out of the sample. According to the invention it is not necessary to examine and typify each object contained in the sample. It is sufficient to examine a substantially characteristic quantity of objects from the sample. According to the invention for example a specific portion can be examined which over a series of tests corresponds or is proportional to the quantity of objects in the sample in statistical average.

An object in the sense of the present invention is a macroscopic item such as a particle or an accumulation of particles. This includes in particular clots caused by mastitis or dust or sand grains, straw particles, tissue particles, (milk) bubbles, small milk pools, mirrored radiation or reflection or the like. If no object is found, the quality of the sample is ranged in a predetermined grade. A distinction is made according to the object type i.e. whether the object is a clot, a straw particle etc. or another object such as a bubble, sand, etc.

Preferably the entire sample is assigned to a specific quality grade based on the result of typing.

According to the invention, determination of the quality of milk depends not only on the mere detection of particles but in particular on recognition of particles i.e. the particle type. The invention allows to analyze the type so as to enable a distinction not only between particle-containing milk and particle-free milk but so that also particles are classified.

It is a significant advantage that the invention can be employed during milking. There is no need for a complicated, large construction to detect and distinguish particles. The method can preferably be applied online or quasi online so as to determine a result during the milking operation.

It is preferred in typifying the objects that for the type of object a distinction is made at least between particle objects and non-particle objects. Particle objects include e.g. sand grains, clots, straw particles etc. while examples of non-particle objects include milk bubbles or reflections. The distinction and typifying into particle objects versus non-particle objects serves to considerably improve the determination of quality.

A specific embodiment provides that a distinction is made in the object type preferably at least between mineral particle objects and biological particle objects. This is considerably advantageous since mineral particle objects such as sand grains will not be identified as clots when employing the invention. In the prior art such objects would have been identified as clots which are symptomatic of poor health of the cow udder. In the present example however a large number of mineral particle objects would be present which may be indicative of inadequate udder cleaning.

The object type non-particle object is preferably differentiated at least between the object types bubble object and/or reflection object and/or defect object.

Defect objects may be caused e.g. by particles from a prior measuring or by drops or fly specks e.g. on the camera, or by defects, scratches or grooves etc. on the measuring surface.

Advantageously at least one area of interest is identified which is characteristic of at least one object. Preferably at least one boundary locating routine is performed to determine objects.

All of the embodiments preferably provide that at least one parameter be specified. By using the at least one parameter an object is then preferably typified.

Advantageous embodiments provide that at least one parameter is captured optically. Preferably at least one parameter is derived from optical lightness, or optical lightness is used to determine a parameter.

For determining a parameter the outer contour of an object may be employed. A contrast may also be used to determine at least one parameter.

Preferably at least one color is employed to determine at least one parameter.

Advantageous embodiments and configurations provide that a milk sample to be examined is routed onto a measuring surface and an image of the measuring surface is captured. At least one object recognition rule is used to distinguish between at least two types of detected objects or particles.

The invention offers for example the option of detecting isolated or accumulated clots and/or foreign particles in milk. The objects are subsequently recognized and clots distinguished from other particles. The method according to the invention and the device according to the invention offer the option of detecting and making visible, particles such as straw, sand, or clots.

In preferred specific embodiments "harmless" particles such as straw or sand can readily be distinguished from clots. Known methods that only identify particles would recognize also "harmless" particles as clots. In such a case the milk would wrongly not be used further in whole or in part. One possible further use is feed for calves or possibly placing on the market. Without the invention the total output of a dairy farm might possibly decrease.

The invention allows to obtain information in every milking operation which allows drawing a number of conclusions. This can be most helpful in reducing and preventing udder disorders in the barn. The milk output and the milk quality can thus be increased even further. For example a defective cleaning brush or incorrect bedding or a defective cleaning unit for the barn can thus be detected.

An analysis of the types, the quantity and e.g. the sizes of the objects allows to draw conclusions on the quality of udder cleaning and barn hygiene. A large number of straw, feces or sand objects is indicative of inadequate cleaning which may be caused by an ineffectively or faultily operating cleaning device or inadequate cleaning by the milker.

It is also conceivable that as particles are detected in the examined milk, a (perhaps additional) milk sample is diverted for analysis. This may be performed subsequently by means of a separate device through the farmer or at an external place.

Unlike the methods thus far known which only provide an examination for the presence of particles, an object type will be assigned to a recognized object herein. This method ensures that milk containing for example foreign particles such as straw, sand or the like, is assigned to another object type in terms of quality than milk in which clots were established which are indicative of pathological changes of the udder.

Thus the method according to the invention offers the possibility to assign characteristic information to specific object types, thus enabling a distinction between milk e.g. containing clots and thus unsuitable for human consumption, and milk containing foreign matter such as sand grains but otherwise of excellent quality. Feces in the milk can also be detected and typified such that this milk can be diverted.

Particles which may include e.g. straw, sand or the like can enter the milk if the prior udder cleaning had been inadequate. Assigning specific object types also allows to determine the frequency at which specific object types occur. This will then also allow to draw conclusions as to cleaning of the udder. With udders being cleaned mechanically, frequent occurrence of specific object types will allow the conclusion that the mechanical cleaning is inadequate such that measures must be taken to improve the mechanical cleaning of the udder.

If milk comprises particles rated "harmless", such particles can be separated out of the milk. This can be performed for example by filtering the milk. Such milk may be placed on the market. This will allow a more reliable assessment of the total output of a dairy farm. Additionally the method according to the invention will reduce the total amount of time and work in a dairy farm by way of reducing the number of "false alarms" in terms of presence of clots and thus of incorrect grading of the state of health.

A decision on whether or not the milk extracted during the milking operation is marketable must be made comparatively fast since the milking operation should not be interrupted. To facilitate and accelerate determination of the milk quality it is therefore proposed that at least one area of interest be identified which area of interest is characteristic for determining the at least one characteristic value.

If the quarters are measured individually, individual results per quarter may be established and diverted individually per quarter while observing any legal requirements.

For analysis, reference values or reference images may be employed. Dark images for improving the analysis quality may also be used.

The reference image may be an image that is an image of a faultless sample. This is not inevitably necessary. It is also possible to create before each milking operation and/or before each measuring, a reference image for example of the sample holder. This measure allows that defects, particles or the like inherent to the sampler or residual from a prior measuring, are excluded from subsequent analysis since they have already been detected in the reference image.

Analysis may be performed by employing the image analysis methods known from the prior art. These methods are employed herein for recognizing objects in the milk. According to the invention at least one characteristic parameter is specified to typify recognized objects. Thus, clots are light. There is little color difference within one clot. The clots have no or only very few parallel contours or discoloring. The outer clot contours are non-symmetrical or rough such that the outer contours cannot be readily classified into simple geometric basic shapes. The outer clot contours are clearly distinct from the background. Noticeable changes in hue, saturation and/or intensity occur over short distances and are limited to a small number of pixels.

It has been found that if particles or objects are present they are surrounded by milk. Said particles or objects quasi lie in a "small milk pool". A milk pool shows changes in hue, saturation and/or intensity over many more pixels. Clots are solid objects which are rarely hollow. The color of clots ranges from white through pale yellow to light ocher. Clots may show marbling, shading, or haze.

It has been depicted above that as a rule clots are not symmetrical in their outer contour. This outer contour may range from roundish to worm-shaped. Sickle-shaped clots have also been observed. The size of a clot in its largest dimension ranges from approx. 100 µm up to several millimeters and more.

During milking, part of the milk tends to be foamy. This means that objects in the form of bubbles may be present on the measuring surface which should be typified or classified accordingly. Foam bubbles tend to take on the background color in their center, having a round or circular outer contour. The color of the outer contour ranges in shade from milk-colored to background-colored.

Since animals come into contact with straw and straw may not always be entirely removed from the udder in cleaning, straw particles can also enter the extracted milk. Straw particles can be recognized and typified accordingly based on the characteristics of straw. Straw tends to be grained approximately parallel. Most straw particles have sharp, jagged edges with very few, small radii. The coloring of straw generally ranges from golden yellow through brown to gray brown.

Wood chips may also enter the milk in this way. Wood chips can be recognized e.g. from their color, they tend to be brown or gray. Wood chips have as a rule straight edges with very few or almost no radii. Wood chips frequently show at least one pointed tip. Unlike straw, wood chips usually do not have any distinct grain.

A preferred way of distinguishing and classifying objects is to analyze the hue, intensity and saturation.

For example if image processing should reveal an object as elongated in shape and having sharply defined edges or borders, there is the high probability that it is not a clot but straw.

One or more incident lighting and/or one or more transmissive read methods may be employed. Incident lighting and transmissive read methods will supply different physical quantities being employed for establishing the characteristic quantity with characteristics information. Incident lighting will for example supply data on reflections. Transmissive read may be used to filter data out of the transmission. In both incident lighting and transmissive read, light sources at different frequencies may be used which will further facilitate the determination of characteristic quantities.

A specific embodiment provides for the method to be used for selecting milk.

At least one predetermined quantity of milk is routed into a measuring chamber having at least one capturing unit. At least one part of the liquid phase of the milk in the measuring chamber is then drained out of the measuring chamber. At least a portion of the measuring chamber surface is captured. Capture may be performed for example by means of an optical system, preferably a camera and in particular a digital camera. Such digital camera will supply an image of a surface in the measuring chamber. The image will then be analyzed so as to typify any detected objects. Depending on the result, the milk will either be routed to the marketable milk container or discarded.

Draining at least part of the liquid phase out of the measuring chamber may occur by routing the milk through a filter. It is also conceivable to decant the liquid phase such that any particles which may be in the milk are retained in the measuring chamber.

There is the alternative that a predetermined quantity of milk is routed through a measuring chamber, forming a film which is then captured by the at least one capturing unit provided in said chamber. The milk can for example be routed as a film along a wall surface. A milk film may be formed by having the milk freely flowing over an edge down to a lower level.

Preferably any objects will be isolated out of the sample.

Advantageous embodiments provide for determining the frequency of individual and in particular substantially all of the object types defined.

A quality grade is preferably derived from the frequency of individual object types and/or the object sizes of the different object types.

Another embodiment provides for the method according to the invention to recognize objects in milk. A milk sample to be examined is routed onto a measuring surface and an image of the measuring surface is captured. At least one object recognition rule is used to distinguish between at least two types of detected objects.

Preferably at least particles are detected as objects. It is in particular preferred in specific embodiments that in this configuration all of the specific embodiments and other configurations depicted above be employed.

After typifying the detected objects a quality grade will be assigned to the milk sample. A large number of quality grades may be provided. If predetermined or variable limits are exceeded or not reached, a signal or alarm or a message may be output e.g. to indicate to an operator that specific measures should be taken. For animals where a disorder had been established, improvement may be indicated as values fall below limits, etc.

The device according to the invention for determining the quality of milk comprises a measuring chamber into which a sample can be routed. A detector means for capturing at least a portion of the measuring chamber is provided. At least one determination means is provided suitable for determining a type of an object in the sample on the basis of at least one predefined object recognition rule.

The device preferably comprises corresponding means to perform one or more of the methods depicted above.

The device according to the invention preferably comprises an identification means for identifying at least one area of interest of the sample wherein the area of interest is characteristic for determining the at least one parameter. This will simplify determination of the parameter because preferably only the area of interest is examined and evaluated.

According to yet another preferred embodiment of the device it is proposed to provide it with an extraction means for extracting a fault image from an image of the sample and a reference image. The fault image is employed for determining at least one parameter. This procedure serves to substantially exclude influences causing misinterpretation e.g. due to defects, objects from the previous animal or the like.

It is preferred to use a device where the detector means and/or the determination means detect or determine at least one physical quantity, preferably selected from the group of optical, acoustical and/or electrical properties, in particular the hue, intensity, saturation, electrical conductivity, electrical capacity, reflection and transmission. The detector means preferably operates with incident lighting and/or transmissive read.

A specific embodiment provides a device comprising a control unit and a selection unit wherein, in dependence on the at least one typing, the milk is either routed to the marketable milk container or it is discarded.

According to the invention there is further provided a method for providing a typing or classification database for typing or classification of objects in milk. The method comprises the following steps:

providing a reference image of a milk sample,
providing at least one image of at least one object,
extracting at least one fault image from the reference image and the image of an object,
providing a typing code,
determining characteristic properties of objects in the fault image,
storing the characteristic properties to an object type of the typing code.

This method allows to readily typify new objects and to readily include in the database the object recognition rules required for recognizing objects. This allows flexible expansion of object typing.

Further advantages and details of the methods or the devices are the objects of the embodiments illustrated in the drawings.

DETAILED DESCRIPTION OF THE PREFERRED EMBODIMENTS

Figure 1:
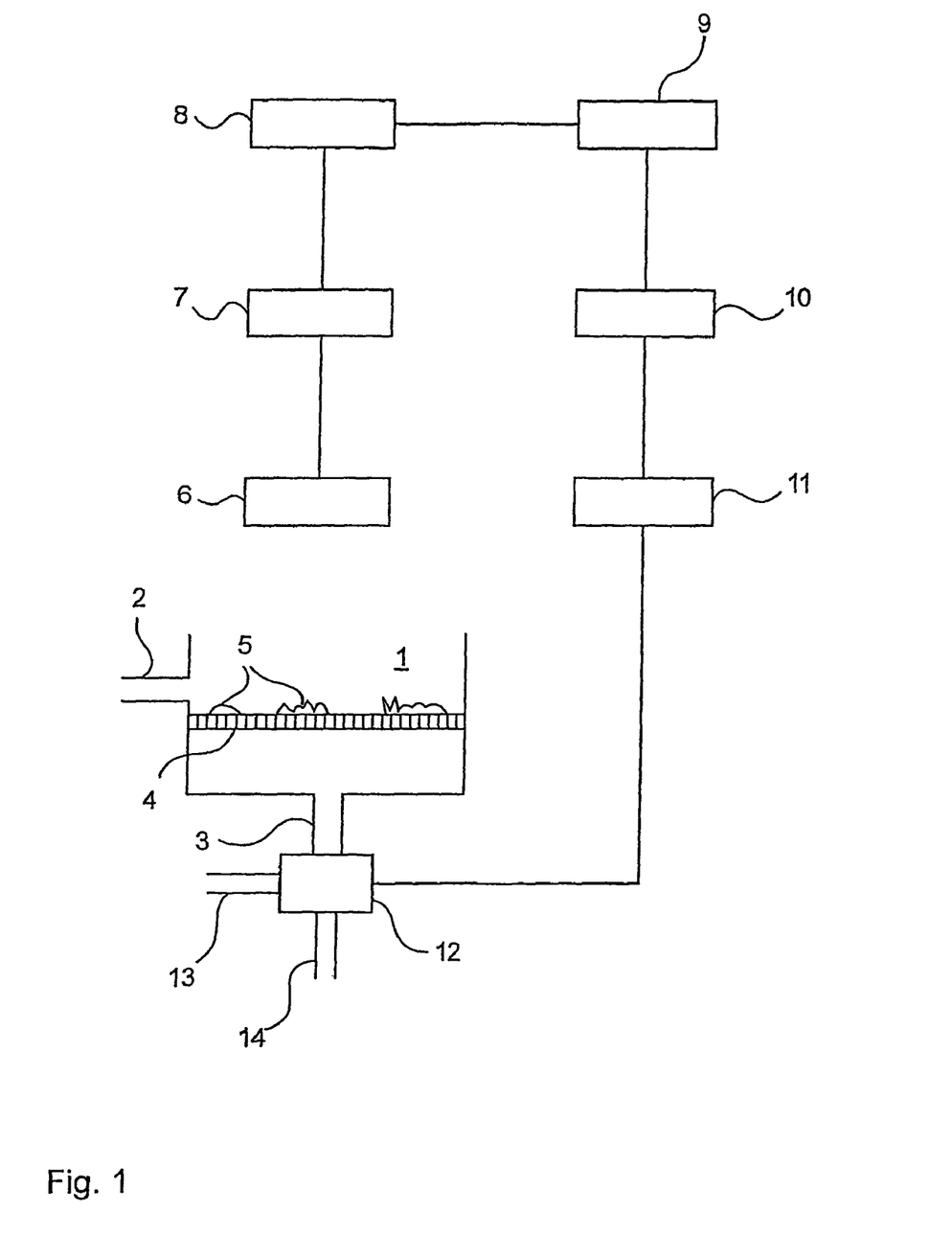
FIG. 1 the schematic structure of a device,
FIG. 2 a schematic process flow, and
FIG. 3 a schematic image with straw objects,
FIG. 4 an image with a clot, and
FIG. 5 a schematic general view of the device according to the invention at a milking place.

FIG. 1 is a schematic illustration of a device with a measuring chamber 1. The measuring chamber 1 comprises an inlet 2 and an outlet 3. The interior of the measuring chamber receives a filter unit 4. The filter unit 4 is positioned such that milk flowing into the measuring chamber 1 through the inlet and leaving the measuring chamber through the outlet 3, flows through the filter unit 4. If the milk contains particles 5, they will be filtered out of the milk by the filter unit 4. Instead of the filter, other retaining or separation means may achieve like or similar results.

The surface of the filter unit 4 with the particles deposited on it is detected by means of a detector means 6. This is detection of a sample. The detector means 6 may for example comprise an optical system, in particular a camera system, preferably a digital camera, which can capture the image of a sample. The detector means 6 is connected with an extraction means 7. The extraction means 7 comprises data from a reference image. The extraction means serves to create a fault image from the image of the sample and a reference image.

The fault image is preferably digitized and transmitted to an identification means 8. The identification means 8 is employed to identify at least one area of interest within the fault image. The area of interest is characteristic for determining at least one parameter.

The device comprises furthermore a determination means 9. The determination means serves to determine at least one parameter of the object of the sample. The parameter may include multiple character data of various kinds. The parameters thus determined are transmitted to a classification means 10 for typing of the detected object. In relation to the result of object typing, a control means 11 may select a selection unit 12 through which the milk is routed either through a line 13 to a not shown marketable milk container or through a line 14 to a non-marketable milk container.

Figure 2:
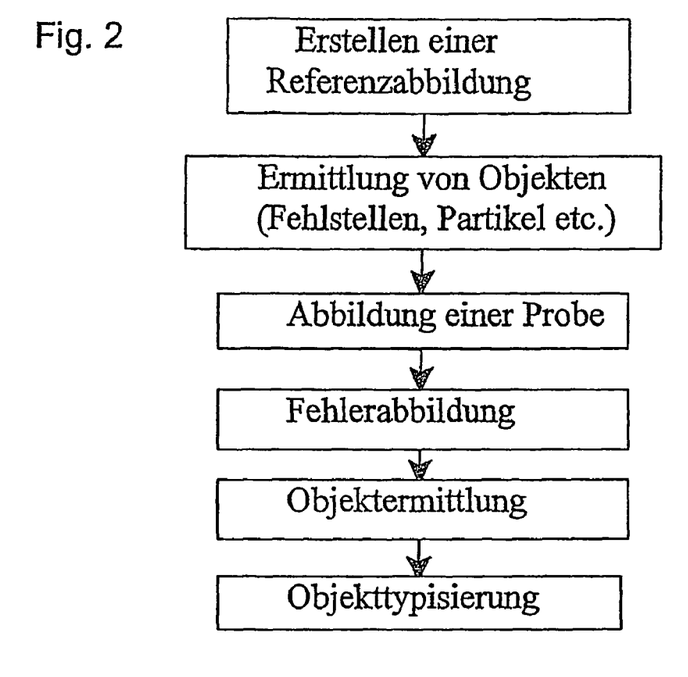

FIG. 2 illustrates a schematic process flow. This process flow serves to perform a determination of the quality of milk. The process of quality determination starts with creating a reference image. This reference image is examined for defects, scratches, particles or the like. This is intended to ensure that defect objects are excluded from subsequent analysis. A reference image is preferably created before each milking operation or else before (and/or after) each reading. Criteria may be established in respect of the reference image. For example the reference image can establish whether particles from a previous milking operation are deposited on the filter. It can also be established whether e.g. cleaning of the filter has been successful.

A fault image can be extracted from the reference image and the imaging of a sample.

Instead of extracting a fault image, ambience comparison may be performed. The sample image will be examined for the presence of large continuities in portions within a specific hue, saturation, and intensity range.

Another step is provided for the determination of objects. To reduce the time and work and the amount of data required for the determination of objects, one area of interest is preferably identified which area of interest is characteristic for the determination of the at least one parameter. For example a search is performed for areas with different hues, saturation, and/or intensities which differ from other portions or lie external of a predetermined tolerance zone.

Differences in hue, saturation, and/or intensity external of a specific tolerance zone are indicative of a contour or a transition from one object to the next. If faults are imaged in digitized form, object transitions or edges may preferably be detected by gradient formation or a boundary locating routine. This will allow recognition of individual objects.

Use of optical systems involves the risk that when creating a sample image reflections appear which have been detected in fault imaging as defects or objects. The aim is therefore to exclude such objects. The same problem occurs if for example a bubble had been present on the sample holder or the filter, i.e. on the measuring surface, at the time of creating a sample image. To exclude bubbles and reflections, intensity, hue, and/or saturation differences are preferably determined close to an object surface. If such part objects are detected, the question will be raised whether very bright spots are present in the direction of the light source and directly adjacent thereto, very dark spots. If this is the case, a reflection or a bubble may be present. Such object can be excluded from further analysis.

The remaining object edges are determined in view of their parameters. Depending on the parameters, the objects are assigned to a predefined typing class or classification class. Depending on the object type, a decision can be made whether the objects are "harmless" objects such as wood chips or straw particles or whether the object is a clot indicative of a pathological change of the udder.

The analysis of the milk sample and determination of the quality will also take into account whether and to what extent and what types of "harmless" objects are present. There will preferably be an output to enable the operator to improve the values in the future e.g. by way of indicating the necessity of improving on udder checks or cleaning.

Object types may be determined on the basis of various criteria. These criteria also depend on the color model employed. If the color model is the HSL (hue, saturation, optical lightness) color model, any other color model may be used as well although the terms of hue, saturation and intensity must then be replaced or adapted to the model used otherwise. With incident lighting, a dark background is preferably used. The criteria should again be adapted accordingly. When using transmissive read, the criteria should be adapted accordingly since e.g. sand grains could no longer be detected.

Figure 3:
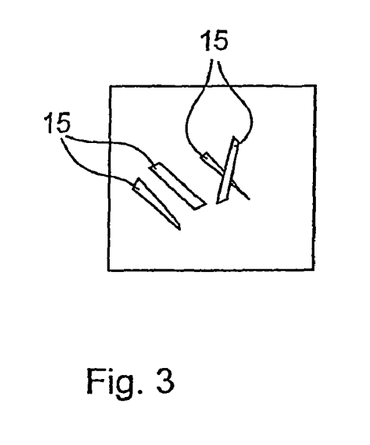

FIG. 3 is a schematic illustration of straw particles—objects 15.

Clots are usually light. Straw particles are generally not very light such that it can be assumed that the object 15 is not a clot.

There is little color difference within one clot. Color differences in straw particles are great so it can be concluded that this is very probably not a clot.

The object 15 comprises parallel contours and discoloring. As a rule, clots have no or very few parallel contours or discoloring so it can be concluded that the object 15 is not a clot.

Clots are typically rough, non-symmetrical in outer contour which cannot be readily classified into simple geometric basic shapes. The outer contour of the object 15 is highly symmetric such that it can be concluded that this is very probably not a clot.

The illustration in FIG. 3 shows multiple objects. At the edges of many areas, the hue, saturation and/or intensity change within a few pixels. This allows the conclusion that some outer edges are present such that multiple objects 15 exist. The observer will also realize that the objects 15 are comparatively solid. Clots also tend to be solid. Only rarely are they hollow such that it could be assumed that the object 15 is a clot. A determination of the color will show that the object 15 is yellow, brown and gray but not light. The color of clots usually ranges from white through pale yellow to light ocher. One can thus draw that conclusion that this is very probably not a clot.

Discolorations in clots e.g. yellow, ocher or brown may be slightly marbled, shaded or swirled. Object 15 does not show any marbling or swirls so it can be assumed that it is not a clot.

Clots tend to have a circular outer contour. They may have a worm-like shape. Object 15 is neither roundish nor worm-shaped such that it is very probably not a clot.

Sickle-shaped clots are also possible. The object 15 does not have such a shape.

The size of a clot in its largest dimension ranges from approx. 0.1 mm up to several millimeters. Some of the objects 15 have such a size such that they may be clots.

Foam and bubbles tend to take on the background color in the center, typically having a round or roundish outer contour. The color of the outer contour ranges from whitish to background-colored. Viewing the objects 15 in their entirety will reveal a background-colored core. It may be foam.

Straw tends to show an approximately parallel grain. Straw is furthermore identifiable in that it has sharp, jagged edges with very few small or no radii. The objects 15 can be found to exhibit parallel lines. Furthermore, sharp edges with few radii can be recognized such that this is for example very probably straw.

Additional criteria may be established for other objects. Thus it may occur that in addition to straw, feces, wood chips or sand enter the milk. Different criteria may be established for such particles. For example feces will as a rule be brown or green or speckled in these colors. Feces occur rather roundish.

Most wood chips are brown or gray in color. Their edges tend to be straight, having next to no radii. Wood chips frequently show at least one pointed tip. Unlike straw, wood chips usually do not show any distinct grain. Sand has a core that tends to take on the background color (transparent) or is light brown and roundish.

Existing definitions of other objects will also be checked when determining objects. The object 15 for example has the colors brown, yellow, and gray. However, there is no green such that the object 15 is very probably no feces. No particular roundness can be detected.

The object 15 is gray/brown among other things. It is possibly a chip. Sharp edges with few radii can be detected. This would indicate the possibility that the object 15 is a wood chip. A clearly defined point is not detectable such it is very probably not a wood chip.

The distinctive grain suggests that it may be straw. The core of the objects 15 is not background-colored nor light brown such that sand can very probably be excluded. Nor can very bright spots be detected on the fault image and thus reflection is absent.

Based on determination of the particular assignations which are also referred to as object recognition rules there is the high probability that the objects 15 are straw.

Absent such identification the objects 15 would possibly be recognized as clots. This would result in that the good milk would have been graded as non-marketable. Thus, however, the milk output of a dairy farm will be reduced.

Figure 4:
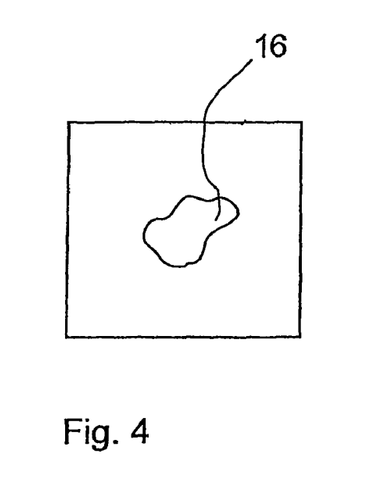

For example if in fault imaging a portion has been identified containing an object 16 as in FIG. 4, the object 16 will by typified as is done in object determination for the objects 15. The object 16 is light such that it may be a clot. There is little color difference within the object 16. It might be a clot.

The object 16 does not comprise parallel contours. One can thus draw the conclusion that it is very probably a clot. One can recognize that the outer contour is rough which is indicative of a clot. If shades can be determined within the object 16 and hue, saturation and/or intensity change over only a few pixels it can be assumed that the object 16 is only an object.

If a variation over multiple pixels of hue, saturation and/or intensity cannot be detected one can draw the conclusion that this is not a "milk pool".

If the object is found to be solid it may be a clot. If the object 16 is white in color and in the upper area, light ocher, it is very probably a clot. If in the upper area a shade-like light ocher area can be detected it may very probably be a clot.

A roundish shape of the outer contour is indicative of a clot. The size of the object 16 would indicate that it might be a clot.

The center area of the object 16 does not show a background-colored region. Nor can a round outer contour be recognized such that the object 16 is very probably not a bubble. Nor can any parallel grain be recognized such that the object 16 is very probably not a bubble.

Although the object 16 comprises jagged edges, there is some roundness at the edge. The object 16 may possibly be straw but it is unlikely. The color is not golden brown and/or gray brown such that the object 16 is not straw. Nor is the object colored brown or green nor is it speckled in these colors such that the conclusion can be drawn that the object 16 is not feces. However, the roundish shape of the object is indicative of possibly present feces.

Then other object types such as wood chip, sand etc. should also be queried. Dependent on the entire queries the conclusion can be drawn that the object 16 is a clot.

The invention has numerous advantages. In particular because a classification of the objects is possible, the quality of the milk can be established more reliably. Objects which in the past had been graded as clots can now be definitely identified and determined. Milk containing "harmless" particles such as straw will no longer be graded non-marketable but can be graded as marketable milk.

Figure 5:
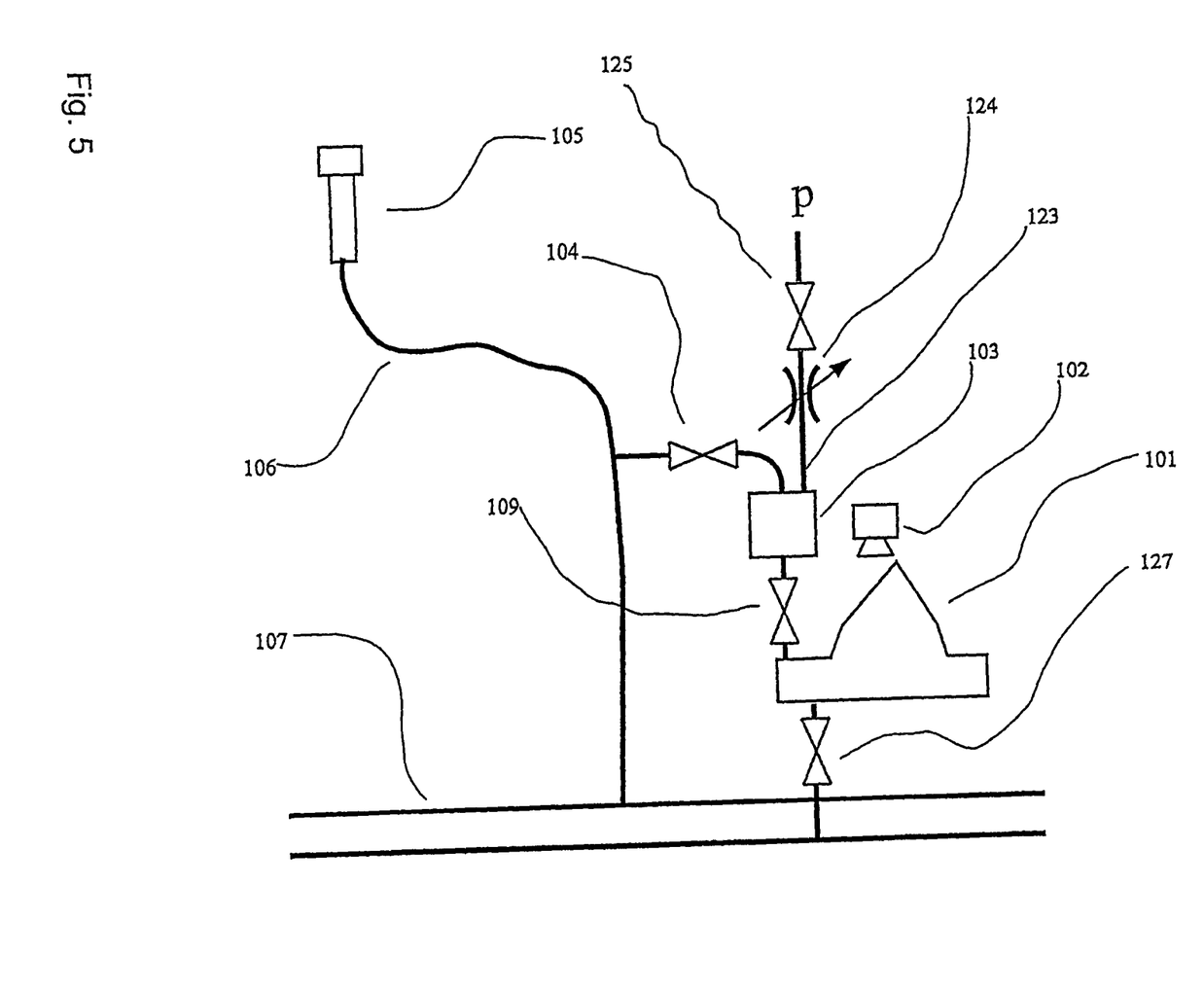

FIG. 5 schematically illustrates the structure of another embodiment of a device 101 according to the invention.

This embodiment shows a milking method operating individually for each quarter. it is also conceivable to install the device subsequent to a milk collection piece (not shown) for analyzing the total milk yield. Furthermore another embodiment of the device is conceivable which with a milking method operating individually for each quarter only requires one measuring device 101 in that a suitable valve arrangement is provided to consecutively feed milk to the measuring device 101.

During milking, milk flows out of the udder teats, being routed through the teat cup 105 and the long milk hose 106 into the "good" milk line 107.

At the start of or later during milking, part of the milk is diverted through the valve 104 into the storage tank 103 which serves as temporary storage for milk samples. After filling the storage tank 103 or filling up with a specified sample quantity, the valve 104 will shut off the inlet to the storage tank 103.

The storage tank 103 serves on the one hand as temporary storage for the milk and on the other hand to eliminate/minimize foam. This is realized in that the foam will float on top due to its density being lower than that of milk and in that the milk to be examined is drawn from the bottom.

For analysis, a first portion of the milk in the storage tank 103 is drained into the measuring device 101 through additional valves 109 and 125 while the valve 127 remains shut. The valves 109 and 125 are briefly opened and immediately shut again to convey a sample into the measuring device 101.

The "bad" milk line may be under atmospheric pressure. In this case it is preferred that the valves 109 and 127 are non-controlled check valves since the valve 127 will then be directed toward atmospheric pressure.

In this embodiment the storage tank 103 is filled and then put under atmospheric pressure e.g. by opening the valve 125 while the other valves remain shut. Air will flow through the valve 125 via the throttle 124 into the storage tank 103.

Subsequently the valve 127 can be opened, being regulated such as to slowly drain a sample to be examined into the measuring device 101. It is also conceivable to feed compressed air through the valve 125 during draining. The pressure of the compressed air will then preferably be controlled via the throttle 124 and through a conduit 123 such that draining of the milk from the storage tank will be regulated and smooth. This is an advantage since a smooth, slow flow will prevent that particles are flushed off the measuring surface which may happen with too high flow velocities.

The present invention also allows to draw conclusions on the quality of udder cleaning or the quality of the cleanliness in the barn and stalls. It is furthermore possible to detect blood present as swirls or red specks. It is also possible to detect tissue. Depending on the result, the fastest possible examination and treatment of the animal concerned can be initiated.

Analysis is carried out by means of standardized image processing by optical system 102. Analysis will include at least one of the following object recognition rules. The object recognition rule should be understood as principles, deviations being conceivable in individual cases. A rule that is fulfilled is indicative of the type of particle. As the number of fulfilled rules increases so will the reliability of the result increase. In individual cases, a fulfilled rule may be disproved by one or more others.

The object recognition rules below are

Multiple object recognition rules may be considered in this sequence or in any other appropriate sequence:

R1 Clots are usually light.
R2 There is little color difference within one clot.
R3 Most clots have no or only very few parallel contours or discoloring.
R4 Clots are characterized in that they are typically rough, non-symmetrical in outer contour which cannot be readily classified into simple geometric basic shapes.
R5 The outer object contours are clearly distinct from the background. Any changes in hue, saturation and/or intensity occur over a small number of pixels.
R6 A "milk pool" which can be detected at the edge of almost all objects, shows changes in hue, saturation and/or intensity over many more pixels. A "milk pool" is a thin milk film remaining on the measuring surface; a thin milk film remains around particles.
R7 Most clots are solid and rarely hollow.
R8 The color of clots usually ranges from white to pale yellow or light ocher.
R9 Discolorations recognized in a clot e.g. yellow, ocher or brown may be slightly marbled, shaded or swirled.
R10 The outer contour of a clot may range from roundish to worm-shaped.
R11 Sickle-shaped clots can be observed repeatedly.
R12 The size of a clot in its largest dimension ranges from approx. 0.1 mm up to several millimeters.
R13 Foam/bubbles tend to take on the background color (transparent) in their center having a round or roundish outer contour. Its color ranges from whitish (milk colored) to background-colored.
R14 Straw tends to show an approximately parallel grain.
R15 Moreover, straw is distinguished by sharp, jagged edges with very few or no radii.
R16 Straw is mostly golden, brown, and/or gray brown.
R17 Feces will as a rule be brown or green or speckled in these colors.
R18 Feces is rather roundish.
R19 Wood chips tend to be brown or gray in color.
R20 The edges of wood chips tend to be straight, having next to no radii.
R21 Wood chips frequently show at least one pointed tip.
R22 Unlike straw, wood chips usually do not show any distinct grain.
R23 Sand has a core that tends to take on the background color (transparent) or is light brown and roundish.
R24 Very bright spots at or in other objects are mostly reflections.
R25 Reflections will be found in the direction of the light source(s). The close ambience must be examined for evaluation.

Detection is performed on the basis of the rules described and any recognized objects or particles are typified. The process is preferably repeated for each recognized object until the storage tank 103 is completely drained. This allows maximizing the statistical reliability which is useful with analysis. It is also conceivable to make decisions based on one pass.

For weighting the individual object recognition rules, a conventional control or analysis unit may be employed which may include a fuzzy logic system.

The invention claimed is:

1. A method for determining the quality of milk, the method comprising the steps of:
   examining a milk sample with a detector; and
   applying an object recognition rule to the examined milk sample using a determination device, the object recognition rule including the steps of:
   detecting an object in the milk sample;
   distinguishing the object type as either a particle object or a non-particle object; and
   distinguishing a particle object type as either a mineral particle object or a biological particle object.

2. The method according to claim 1, and further comprising the step of:
   extracting the object from the sample with a controller.

3. The method according to claim 1, wherein the non-particle object type is a bubble object.

4. The method according to claim 1, wherein the step of detecting an object in the milk sample comprises the step of:
   identifying a portion of interest of the milk sample with an identification device.

5. The method according to claim 1, wherein the step of detecting an object in the milk sample based on the object recognition rules comprises the step of:
   locating a boundary of the object with the determination device.

6. The method according to claim 1, and further comprising the steps of:
   specifying an object parameter for the object recognition rule; and
   detecting that parameter in an object with the determination device.

7. The method according to claim 6, wherein the step of specifying the object parameter comprises the step of:
   optically capturing the object parameter with an optical device.

8. The method according to claim 6, wherein the step of specifying the object parameter comprises the step of:
   deriving the object parameter from optical lightness of the object with the determination device.

9. The method according to claim 6, wherein the step of specifying the object parameter for the object recognition rule comprises the step of:
   deriving the object parameter from an outer contour of an object with the determination device.

10. The method according to claim 6, wherein the step of specifying the object parameter for the object recognition rule comprises the step of:
    deriving the object parameter from contrast of the object with the determination device.

11. The method according to claim 6, the step of specifying the object parameter for the object recognition rule comprises the step of:
    deriving the object parameter from a color of the object with the determination device.

12. The method according to claim 1, and further comprising the step of:
    specifying a plurality of object parameters for the object recognition rule to determine an object type of a detected object using the determination device.

13. The method according to claim 1, and further comprising the step of:
    employing fuzzy logic with the determination device to determine and vary a plurality of parameters for an object type of a detected object.

14. The method according to claim 1, and further comprising the step of:
    performing gradient formation with the determination device in view of a physical quality wherein the physical quality is selected from the group consisting essentially of: hue, intensity, saturation, electrical conductivity, electrical capacity, reflection, transmission, and combinations thereof.

15. The method according to claim 1, and further comprising the step of:
    determining a characteristic value of the object using the determination device.

16. The method according to claim 1, and further comprising the step of:
    specifying an object parameter with the determination device for the object recognition rule that is detectable through incident lighting.

17. The method according to claim 1, and further comprising the steps of:
    determining milk quality based on an object type using the determination device; and
    then selectively routing the milk to a marketable milk container or discarding the milk using a controller.

18. The method according to claim 1, and further comprising the steps of:
    routing a predetermined quantity of milk into a measuring chamber using a controller; and
    draining at least part of the liquid phase of the milk from the measuring chamber using the controller; and the step of examining the milk sample comprises the step of:
    capturing an image of at least a portion of the measuring chamber surface with an optical device.

19. The method according to claim 1, wherein the step of:
    examining a milk sample comprises the steps of:
    routing a predetermined quantity of milk across a measuring chamber surface, on which a film is formed using a controller; and
    capturing an image of the measuring chamber surface using an optical device.

20. The method according to claim 1, and further comprising the step of:
    removing the object from the milk sample with an extractor.

21. The method according to claim 1, and further comprising the step of:
    determining a frequency of object detections of for individual object types using the determination device.

22. The method according to claim 1, and further comprising the step of:
    deriving a milk quality grade from a detection frequency for individual object types using the determination device.

23. The method according to claim 1, wherein the non-particle object type is a reflection object.

24. The method according to claim 1, wherein the non-particle object type is a defect object.

25. The method according to claim 1, and further comprising the step of:
    specifying an object parameter for the object recognition rule that is detectable through a transmissive read method.

26. The method according to claim 1, and further comprising the step of:
    deriving a milk quality grade from an object detection frequency for individual object sizes.

27. The method according to claim 1, and further comprising the steps of:
    distinguishing the object from a defect; and
    excluding the defect from being considered by the object recognition rule.

* * * * *